United States Patent
Dean et al.

(10) Patent No.: US 9,672,525 B2
(45) Date of Patent: Jun. 6, 2017

(54) IDENTIFYING RELATED INFORMATION GIVEN CONTENT AND/OR PRESENTING RELATED INFORMATION IN ASSOCIATION WITH CONTENT-RELATED ADVERTISEMENTS

(75) Inventors: Jeffrey A. Dean, Palo Alto, CA (US); Krishna Bharat, San Jose, CA (US); Paul Buchheit, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1115 days.

(21) Appl. No.: 13/371,570

(22) Filed: Feb. 13, 2012

(65) Prior Publication Data
US 2012/0209726 A1 Aug. 16, 2012

Related U.S. Application Data

(63) Continuation of application No. 10/748,870, filed on Dec. 29, 2003, now Pat. No. 8,140,965.

(60) Provisional application No. 60/450,775, filed on Feb. 28, 2003.

(51) Int. Cl.
*G06F 17/21* (2006.01)
*G06Q 30/02* (2012.01)
*G06F 17/30* (2006.01)

(52) U.S. Cl.
CPC ....... *G06Q 30/02* (2013.01); *G06F 17/30864* (2013.01); *G06Q 30/0277* (2013.01)

(58) Field of Classification Search
CPC ......... G06F 17/30011; G06F 17/30522; G06F 17/30867; G06Q 30/02; G06Q 30/0251; G06Q 30/0256; G06Q 30/0277; G06Q 30/0601; G06Q 30/0629; G06Q 30/0631
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,913,210 A | 6/1999 | Call et al. | |
| 5,933,811 A | 8/1999 | Angles et al. | |

(Continued)

FOREIGN PATENT DOCUMENTS

| | | |
|---|---|---|
| CA | 2439949 | 9/2002 |
| JP | 11 053392 | 2/1999 |

(Continued)

OTHER PUBLICATIONS

Abstract of JP 11-053392 to Toshiba Corp., published Feb. 26, 1999.

(Continued)

*Primary Examiner* — Wilson Tsui
(74) *Attorney, Agent, or Firm* — Fish & Richardson P.C.

(57) ABSTRACT

The usefulness of content (target content), such as advertisements, may be increased by determining additional content and providing such additional content in association with the content. The target content may be text, a Web page, a URL, a search query, etc. The additional content might be related suggested queries (e.g. "Try a search for _____"), news articles (or excerpts or summaries thereof), reviews (or excerpts or summaries thereof), advertisements, user group messages, etc.

12 Claims, 8 Drawing Sheets

(56) References Cited

U.S. PATENT DOCUMENTS

| | | | |
|---|---|---|---|
| 5,948,061 A | 9/1999 | Meniman | |
| 6,006,225 A | 12/1999 | Bowman et al. | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,282,548 B1* | 8/2001 | Burner | G06F 17/3089 |
| 6,285,999 B1 | 9/2001 | Page | |
| 6,317,722 B1 | 11/2001 | Jacobi et al. | |
| 6,336,131 B1* | 1/2002 | Wolfe | G06F 17/30861 709/203 |
| 6,341,306 B1* | 1/2002 | Rosenschein et al. | 709/217 |
| 6,385,592 B1 | 5/2002 | Angles | |
| 6,401,075 B1 | 6/2002 | Mason et al. | |
| 6,460,036 B1 | 10/2002 | Herz | |
| 6,496,803 B1 | 12/2002 | Seet et al. | |
| 6,505,169 B1 | 1/2003 | Bhagavath et al. | |
| 6,563,514 B1 | 5/2003 | Samar | |
| 6,804,659 B1* | 10/2004 | Graham et al. | 705/14.49 |
| 6,816,857 B1 | 11/2004 | Weissman et al. | |
| 6,985,882 B1 | 1/2006 | Del Sesto | |
| 7,039,599 B2 | 5/2006 | Merriman | |
| 7,076,443 B1 | 7/2006 | Emens et al. | |
| 7,136,875 B2 | 11/2006 | Anderson et al. | |
| 7,373,313 B1* | 5/2008 | Kahle et al. | 705/26.3 |
| 7,702,541 B2* | 4/2010 | Black et al. | 705/26.1 |
| 2001/0042064 A1 | 11/2001 | Davis et al. | |
| 2002/0010625 A1 | 1/2002 | Smith et al. | |
| 2002/0063885 A1 | 5/2002 | Dutta | |
| 2002/0069105 A1 | 6/2002 | do Rosario Botelho et al. | |
| 2003/0061201 A1* | 3/2003 | Grefenstette et al. | 707/3 |
| 2003/0204573 A1* | 10/2003 | Beck et al. | 709/218 |
| 2004/0015397 A1 | 1/2004 | Barry et al. | |
| 2004/0073531 A1* | 4/2004 | Patterson | 707/1 |
| 2004/0093558 A1 | 5/2004 | Weaver | |
| 2004/0260767 A1 | 12/2004 | Kedem et al. | |

FOREIGN PATENT DOCUMENTS

| | | |
|---|---|---|
| KR | 1999-0078982 | 11/1999 |
| KR | 2001-0000710 | 1/2001 |
| KR | 2001-0069228 | 7/2001 |
| KR | 2001-0089160 | 9/2001 |
| KR | 2001-0090950 | 10/2001 |
| KR | 2001-0096454 | 11/2001 |
| KR | 2002-0003279 | 1/2002 |
| KR | 2002-0051172 | 6/2002 |
| KR | 2002-0059212 | 7/2002 |
| WO | WO 97/21183 | 6/1997 |
| WO | WO 01/46870 | 6/2001 |
| WO | WO 02/067473 | 8/2002 |
| WO | WO 02/091193 | 11/2002 |
| WO | WO 03/005151 | 1/2003 |

OTHER PUBLICATIONS

Office Action for European Patent Application No. 10 012 977.4-1952, mailed Jul. 19, 2013 (7 pgs.).
U.S. Appl. No. 95/001,073, Reexamination of Stone et al.
U.S. Appl. No. 95/001,061, Reexamination of Stone et al.
U.S. Appl. No. 95/001,069, Reexamination of Stone et al.
U.S. Appl. No. 95/001,068, Reexamination of Stone et al.
Miles Cook, First Drive: 2002 Subaru Impreza WRX, Edmunds.com, Jan. 22, 2001, p. 1, http://web.archive.org/web/20010124084100/www.edmunds.com/roadtests/firstdrive/2002/subaru/impreza/44865/.
CNET Hardware, CNET.com, Dec. 7, 2001, p. 1, http://web.archive.org/web/20011207231045/computers.cnet.com/hardware/resellers/0-1018-311-6603018_.html.
MSN Messenger Service, MSN.com, Dec. 7, 2000, p. 1, http://web.archive.org/web/20001207081500/messenger.msn.com/support/news.asp.
Canadian Office Action for Canadian Patent Application No. 2,516,818, dated Sep. 11, 2007 (8 pgs.).
Notification of the First Office Action for Chinese Patent Application No. 200480007633.X, mailed Dec. 7, 2007 (5 pgs.) (with English Translation (7 pgs.)).
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www.Archive.org, Apr. 12, 1997 and Feb. 1, 1997.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., Advertising on the Internet, 2nd Ed., John Wiley & Sons, 1999.
K. Tateishi et al. "Opinion Information Retrieval From the Internet," Internet System Research Laboratories, NEC Cop., Jul. 16, 2001, vol. 2001, No. 6, pp. 75-82.
Communication for European Patent Application No. 04 715 709.4-2201, mailed on Jun. 27, 2006 (4 pgs.).
Notice of Preliminary Rejection for Korean Patent Application No. 10-2005-7015984, mailed Oct. 25, 2006 (3 pgs.) with translation (3 pgs.).
Notification of Reasons for Rejection for Japanese Patent Application No. 2005-518883, mailed Nov. 13, 2007 (3 pgs.) with translation (3 pgs.).
Canadian Office Action to Canadian Patent Application No. 2,516,818, dated Nov. 4, 2008 (9 pgs.).
Decision of Rejection for Japanese Patent Application No. 2005-518883, mailed Jan. 6, 2009 (2 pgs.) with translation (2 pgs.).
Examiner's Report No. 2 on Australian Patent Application No. 2004216795, dated Feb. 4, 2009 (2 pgs.).
Petitioner's (Soon-Ja Kim) First Brief Against Korean Patent No. 799,095, dated Jun. 5, 2008 (95 pgs.) (with summarized English translation (4 pgs.)).
Respondent's (Google, Inc.) First Reply Brief for Invalidation Trial Against Korean Patent No. 799,095, dated Jul. 22, 2008 (25 pgs.) (with summarized English translation (12 pgs.)).
Petitioner's (Soon-Ja Kim) Second Brief Against Korean Patent No. 799,095, dated Feb. 17, 2009 (37 pgs.) (with summarized English translation (10 pgs.)).
English translation of Referential Material cited in Petitioner's (Soon-la Kim) Second Brief Against Korean Patent No. 799,095, dated Feb. 17, 2009 (4).
English translation of Exhibit A No. 10 cited in Petitioner's (Soon-la Kim) Second Brief Against Korean Patent No. 799,095, dated Feb. 17, 2009 (16).
Respondent's (Google, Inc.) Second Reply Brief for Invalidation Trial Against Korean Patent No. 799,095, dated Mar. 16, 2009 (39 pgs.) (with English translation (23 pgs.)).
Power Point Presentation from a hearing for Invalidation Trial Against Korean Patent No. 799,095, dated Mar. 31, 2009 (52 pgs.) (with English translation (51 pgs.)).
Respondent's (Google, Inc.) Third Reply Brief Against Korean Patent No. 799,095, dated Apr. 14, 2009 (41 pgs.) (with summarized English translation (26 pgs.)).

(56) References Cited

OTHER PUBLICATIONS

Petitioner's (Soon-Ja Kim) Supplementary Brief Against Korean Patent No. 799,095, dated Apr. 27, 2009 (29 pgs.) (with summarized English translation (7 pgs.)).
Respondent's (Google, Inc.) Response to Petitioner's Supplemental Brief Against Korean Patent No. 799,095, dated May 21, 2009 (21 pgs.) (with summarized English translation (12 pgs.)).
Decision Rendered by Trial Board for Invalidation Trial Against Korean Patent No. 799,095, dated Feb. 5, 2010 (20 pgs.) (with summarized English translation (9 pgs.)).
Examiner's First Report on Australian Patent Application No. 2009200599, dated Mar. 2, 2010 (2 pgs.).
Petitioner's (Google, Inc.) Appeal Brief for Invalidation Trial Against Korean Patent No. 799,095, dated Apr. 30, 2010 (28 pgs.) (with summarized English translation (22 pgs.)).
Respondent's (Soon-Ja Kim) Reply Brief Against Korean Patent No. 799,095, dated Jul. 13, 2010 (46 pgs.) (with summarized English translation (17 pgs.)).
Petitioner's (Google, Inc.) Preparatory Brief for Invalidation Trial Against Korean Patent No. 799,095, dated Sep. 8, 2010 (17 pgs.) (with summarized English translation (11 pgs.)).
Power Point Presentation for Invalidation Trial Against Korean Patent No. 799,095, dated Oct. 27, 2010 (32 pgs.) (with English translation (32 pgs.)).
Patent Court's Decision for Invalidation Trial Against Korean Patent No. 799,095, dated Nov. 17, 2010 (28 pgs.) (with summarized English translation (10 pgs.)).
European Search Report for European Patent Application No. 10012977.4-2201; mailed Mar. 4, 2011 (7 pgs.).
Supplementary European Search Report to EPO Application No. 04 71 5709, dated Mar. 31, 2006, 2 pages.
Request for Reexamination of U.S. Pat. No. 7,240,025 B2, Control No. 95/001,073, filed Jul. 30, 2008, 85 pages.
Request for Reexamination of U.S. Pat. No. 6,446,045 B1, Control No. 95/001,061, filed Jul. 7, 2008, 54 pages.
Request for Reexamination of U.S. Pat. No. 7,249,059 B2, Control No. 95/001,069, filed Jul. 21, 2008, 81 pages.
Request for Reexamination of U.S. Pat. No. 6,829,587 B2, Control No. 95/001,068, filed Jul. 14, 2008, 85 pages.
Statement Regarding References in 1449 Form.
Rejection Decision in Brazilian Application No. PI0407912-4, dated Oct. 13, 2016, 7 pages. (with translation, no new art).

\* cited by examiner

IDENTIFYING RELATED INFORMATION GIVEN CONTENT AND/OR PRESENTING RELATED INFORMATION IN ASSOCIATION WITH CONTENT-RELATED ADVERTISEMENTS

§0. RELATED APPLICATIONS

This application is a continuation of U.S. patent application Ser. No. 10/748,870 (referred to as "the '870 application" and incorporated herein by reference), titled "IDENTIFYING RELATED INFORMATION GIVEN CONTENT AND/OR PRESENTING RELATED INFORMATION IN ASSOCIATION WITH CONTENT-RELATED ADVERTISEMENTS" filed on Dec. 29, 2003, and listing Krishna Bharat, Jeffrey A. Dean, and Paul Buchheit as the inventors, which claims benefit to U.S. Provisional Application Ser. No. 60/450,775 (referred to as "the '775 provisional" and incorporated herein by reference), titled "IDENTIFYING RELATED INFORMATION GIVEN CONTENT AND/OR PRESENTING RELATED INFORMATION IN ASSOCIATION WITH CONTENT-RELATED ADVERTISEMENTS," filed on Feb. 28, 2003, and listing Krishna Bharat and Jeffrey A. Dean as the inventors. The scope of the present invention is not limited to any requirements of the specific embodiments in the '775 provisional or in the '870 application.

§1. BACKGROUND OF THE INVENTION

§1.1 Field of the Invention

The present invention concerns determining additional content from target content and may be used to increase the effectiveness of advertising, such as on-line advertising.

§1.2 Background Information

The Internet provides many with access to information of interest. A user might request a document that may concern a topic of interest. Sometimes, however, the document might not turn out to have exactly what the user is looking for, or the user may desire to obtain additional information on the topic. Hypertext links between documents that may concern the same or related topics allow users to navigate or "surf" the Internet in their quest for information on the topic of their interest. However, such links are typically embedded in the document by an author of the document and may be relatively static. Accordingly, the usefulness of links often depends on the foresight and knowledge of the author. Accordingly, there is a need to help users to find content of interest.

Moreover, the Internet is often a useful conduit for companies to relay information about their products and services to potential customers. Therefore, there is a need for companies to put their information before users. To do so, they must entice users to a particular Web page or Website. This will often not happen unless the user is motivated to do so. One way to motivate a user to go to a particular Web page or Website is via on-line ads. Normally, when a member of the advertising audience (referred to as a "viewer" or "user" in the Specification without loss of generality) selects an ad by clicking on it, an embedded hypertext link typically directs the viewer to the advertiser's Website. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed or otherwise rendered) is commonly referred to as the "click-through rate" or "CTR" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed or otherwise rendered) is commonly referred to as the conversion rate. If a conversion is defined to be able to occur within a predetermined time since the serving of an ad, one possible definition of the conversion rate might only consider ads that have been served more than the predetermined time in the past.

Although untargeted online ads may be useful, online ads targeted to the user (e.g., to the user's present topic of interest, to the user's location, to the user's demographic, etc.) generally perform better. For example, search engines, such as Google for example, have enabled advertisers to target their ads so that they will be rendered in conjunction with a search results page responsive to a query that is relevant, presumably, to the ad. Although search result pages afford advertisers a great opportunity to target their ads to a more receptive audience, search result pages are merely a fraction of page views of the World Wide Web. To increase advertising opportunities, some online advertising systems may use ad relevance information and document content relevance information (e.g., concepts or topics, feature vectors, etc.) to "match" ads to (and/or to score ads with respect to) a document including content, such as a Web page for example. (See, e.g., U.S. patent application Ser. No. 10/375,900, titled "SERVING ADVERTISEMENTS BASED ON CONTENT," filed on Feb. 26, 2003, listing Darrell Anderson, Paul Bucheit, Alex Carobus, Claire Cui, Jeffrey A. Dean, Georges R. Harik, Deepak Jindal and Narayanan Shivakumar as inventors (incorporated herein by reference and referred to as "the '900 application").) The foregoing ad serving systems can be thought of as keyword-targeted systems (where ads are targeted using terms found in a search query) and content-targeted systems (where ads are targeted using content of a document).

Although keyword and content targeted ad serving, when executed well, have provided users with information relevant to a current interest and have therefore been very effective at enticing users to visit Web pages linked from such ads (also referred to as an "ad landing page"), there remains a desire to improve the performance of on-line advertising.

§2. SUMMARY OF THE INVENTION

The present invention may improve a user's Internet experience when the user is to be presented with target content, such as content in a user requested document for example. The present invention may do so by (i) determining additional content using the target content (or information thereof), and (ii) presenting both the target content and the additional content to the user.

Such additional information may be of interest to the user. This fact may be used to improve the performance of online ads. For example, additional content related to content that is being (or is to be) presented (e.g., shown or otherwise rendered, e.g. in a browser, text editor, printed material, or any other content rendering application or device) may be generated. In some environments, the additional content presented can be placed within an advertisement (or near an advertisement, or otherwise presented in association with an advertisement). In this case, the additional content should increase the likelihood that the user will look at (or otherwise perceive) the advertising material (or that the advertising material will otherwise get the user's attention), because the advertising area contains additional kinds of relevant information—not just ads. For example, the target content might be an advertisement for a product, and the additional content might be reviews or news stories about the product.

The target content may be text, a Web page, a URL, or a search query, just to name a few of the many possibilities. The additional content might be related suggested queries (e.g. "Try a search for _____"), news articles (or excerpts or summaries thereof), reviews (or excerpts or summaries thereof), advertisements, etc. The additional content could be presented in various ways or forms. For example, the additional content may be presented as a suggested query, "related information," etc. Although an excerpt or summary of the additional content may be presented instead of the entire additional content, such an excerpt can be considered to be "additional content" itself.

One way to generate the additional content in a manner consistent with the present invention is to examine various sources of information and determine a "score" for various potential items of additional content. The sources can be a list of queries (such as a log of past queries), news articles, reviews, weather, a set of ads, etc. There are various methods for calculating the scores. In one embodiment, the scores can be used to help determine the relevancy of the additional content to be shown.

§3. BRIEF DESCRIPTION OF THE DRAWINGS

§4. DETAILED DESCRIPTION

Figure 1:
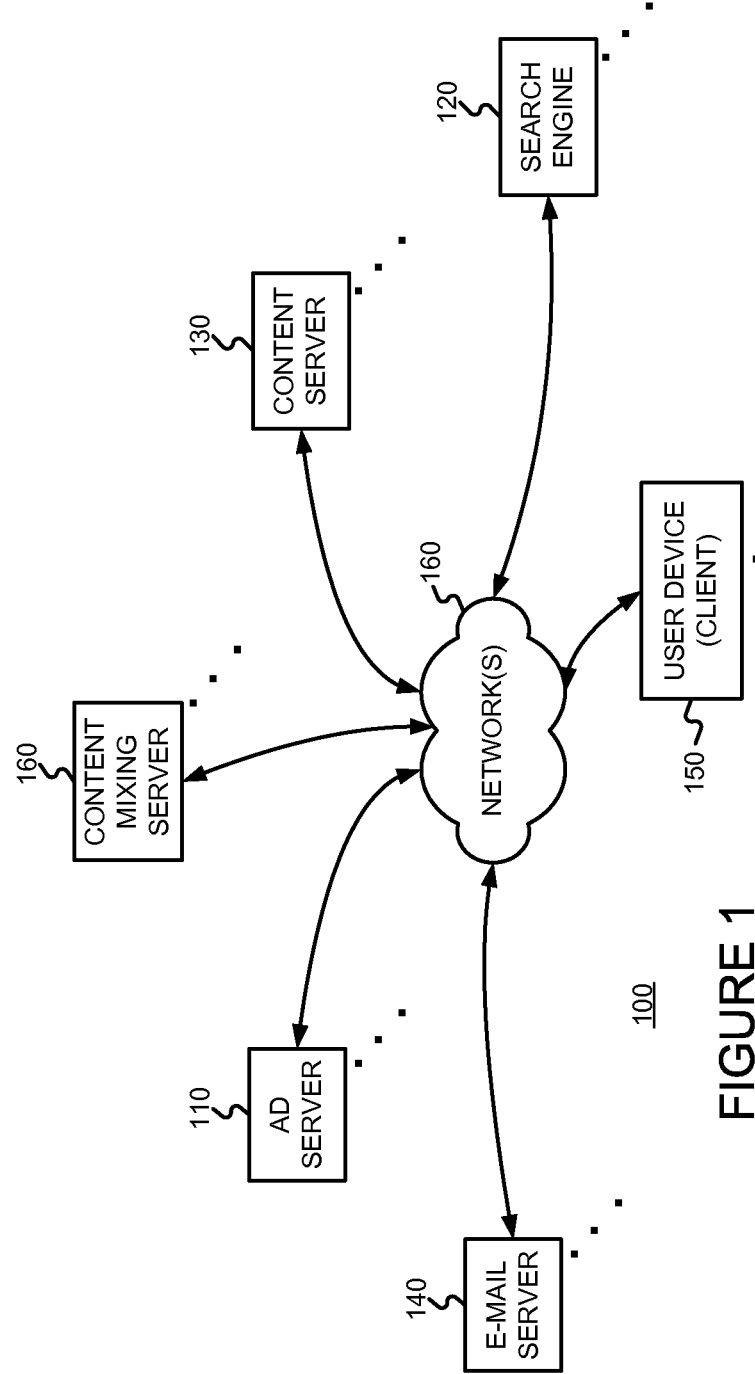
FIG. 1 illustrates an exemplary environment in which the present invention may be used.

The present invention may involve novel methods, apparatus, message formats and/or data structures for increasing the usefulness of content, such as advertisements, by determining additional content and providing such additional content in association with the content. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in §4.2. Then, exemplary methods of the present invention are described in §4.3. Exemplary apparatus of the present invention are described in §4.4. Finally, some conclusions regarding the present invention are set forth in §4.5. First, however, certain terms used are defined in §4.1.

§4.1 Definitions

Online ads, such as those used in the keyword-targeted or content-targeted ad serving systems like those introduced in §1.2 above, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. "Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, etc. It may include latitude and/or longitude, or a range thereof. It may include information, such as an IP address, from which a user location can be estimated. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described. First, however, exemplary environments in which, or with which the present invention may be used are introduced in §4.2.

§4.2 Exemplary Environments in which, or with which the Present Invention May be Used FIG. 1 illustrates an environment 100 in which the present invention may be used. A user device (also referred to as a "client" or "client device") 150 may include a browser facility (such as the Explorer browser from Microsoft, the Opera Web Browser from Opera Software of Norway, the Navigator browser from AOL/Time Warner, etc.), an e-mail facility (e.g., Outlook from Microsoft), or any other software application or hardware device used to render content, etc. A search engine 120 may permit user devices 150 to search collections of documents (e.g., Web pages). A content server 130 may permit user devices 150 to access documents. An e-mail server (such as Hotmail from Microsoft Network, Yahoo Mail, etc.) 140 may be used to provide e-mail functionality to user devices 150. An ad server 110 may be used to serve ads to user devices 150. The ads may be served in association with (i) search results provided by the search engine 120. Content-relevant ads may be served in association with content provided by the content server 130, and/or e-mail supported by the e-mail server 140 and/or user device e-mail facilities. The various servers can store "other information". For example, content servers 130 can store news stories, reviews, user group messages, etc. Search engines 120 can store search queries, etc.

As discussed in the '900 application, ads may be targeted to documents served by content servers. Thus, one example of an ad consumer is a general content server 130 that receives requests for documents (e.g., articles, discussion threads, music, video, graphics, search results, Web page listings, etc.), and retrieves the requested document in response to, or otherwise services, the request. The content server 130 may submit a request for ads to the ad server 110. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, end user local time information, document information, etc.

The content server 130 may combine the requested document with one or more of the advertisements provided by the ad server 110. This combined information including the document content and advertisement(s) is then forwarded towards the end user device 150 that requested the document, for presentation to the user. Finally, the content server 130 may transmit information about the ads and how, when, and/or where the ads are to be rendered (e.g., position, click-through or not, impression time, impression date, size, conversion or not, etc.) back to the ad server 110. Alternatively, or in addition, such information may be provided back to the ad server 110 by some other means. Consistent with the present invention, the ad server 110 may store ad performance information.

Another example of an ad consumer is the search engine 120. A search engine 120 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 120 may submit a request for ads to the ad server 110. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as end user local time information, geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 120 may combine the search results with one or more of the advertisements provided by the ad server 110. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 120 may transmit information about the ad and when, where, and/or how the ad was to be rendered (e.g., position, click-through or not, impression time, impression date, size, conversion or not, etc.) back to the ad server 110. Alternatively, or in addition, such information may be provided back to the ad server 110 by some other means.

Finally, the e-mail server 140 may be thought of, generally, as a content server in which a document served is simply an e-mail. Further, e-mail applications (such as Microsoft Outlook for example) may be used to send and/or receive e-mail. Therefore, an e-mail server 140 or application may be thought of as an ad consumer. Thus, e-mails may be thought of as documents, and targeted ads may be served in association with such documents. For example, one or more ads may be served in, under, over, or otherwise in association with an e-mail.

Although the foregoing examples described servers as (i) requesting ads, and (ii) combining them with content, one or both of these operations may be performed by a client device (such as an end user computer for example).

The present invention may be carried out, at least in part, on content mixing server 160. Alternatively, various aspects of the present invention may be performed on one or more of the ad server 110, search engine 120, content server 130, e-mail server 140, user device 150, and content mixing server 160.

§4.3 Exemplary Methods

Figure 2:
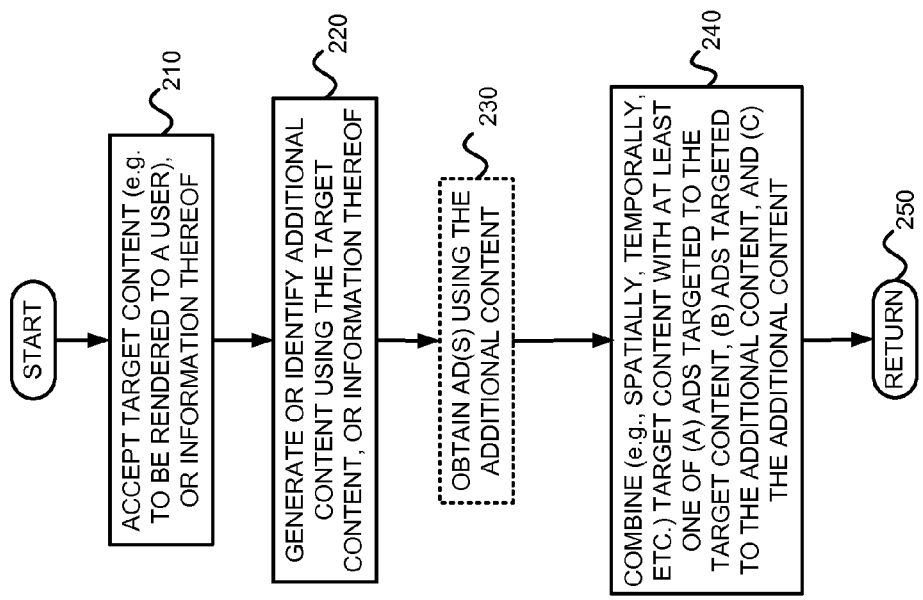
FIG. 2 is a flow diagram of an exemplary method that may be used to combine additional content with target content in a manner consistent with the present invention.

FIG. 2 is a flow diagram of an exemplary method 200 that may be used to combine additional content with target content in a manner consistent with the present invention. As shown, target content (e.g., content to be presented to a user), or information thereof (e.g., a URL of a Webpage), is accepted. (Block 210) Additional content is generated or identified using the target content or the information thereof. (Block 220) Note that the additional content may be advertisements, though it need not be. Recall that the additional content may be determined from an information source which may include news stories, product reviews, service reviews, search queries, etc. Ads may be obtained (e.g., requested and/or served) using the additional content. (Block 230) The target content may then be combined (e.g., spatially in window, on separate windows, temporally, etc.) with at least one of (a) ads targeted to the target content, (b) ads targeted to the additional content, and (c) the additional content (Block 240) before the method 200 is left (Node 250).

Referring back to block 220, one way to generate the additional content in a manner consistent with the present invention is to examine various sources of information and determine a "score" for the various potential items of additional content. The sources can be a list of queries (such as a log of past queries), news articles, reviews, weather, a set of ads, etc. There are various methods of determining scores for each source of information. In certain embodiments of the present invention, the methods will have the basic scheme of extracting features (terms, concepts, categories, etc.) from each item in the information sources as well as the content of the page, and may involve using information retrieval techniques known to those of skill in the art to assign scores using a match between the information item's features and those of the target content (Web page).

In one embodiment, the scores can be used to help determine the relevancy of advertisements to be shown. For example, given a target content Web page about theme parks, sources might be examined and a current news story "Disney to Open Theme Park in Beijing Next Week" may be determined to be a high scoring additional content item. Based on this (high score) additional content item, an ad "Buy Tickets to Beijing" might be targeted to the Web page. Of course, the target Web page could also be used, and an ad for "Buy a book 'The Best Theme Parks'" could be targeted. Indeed, both can be used to target an ad "Buy the book 'Theme Parks in China'". Accordingly, additional content can be selected and used as further target content. Further additional content may then be selected using the further target content. This may be expressed by the following:

additional_content_0=f{target_content_0};
target_content_1=target_content_0+additional_content_0;
additional_content_1=f{target_content_1}.

Figure 3:
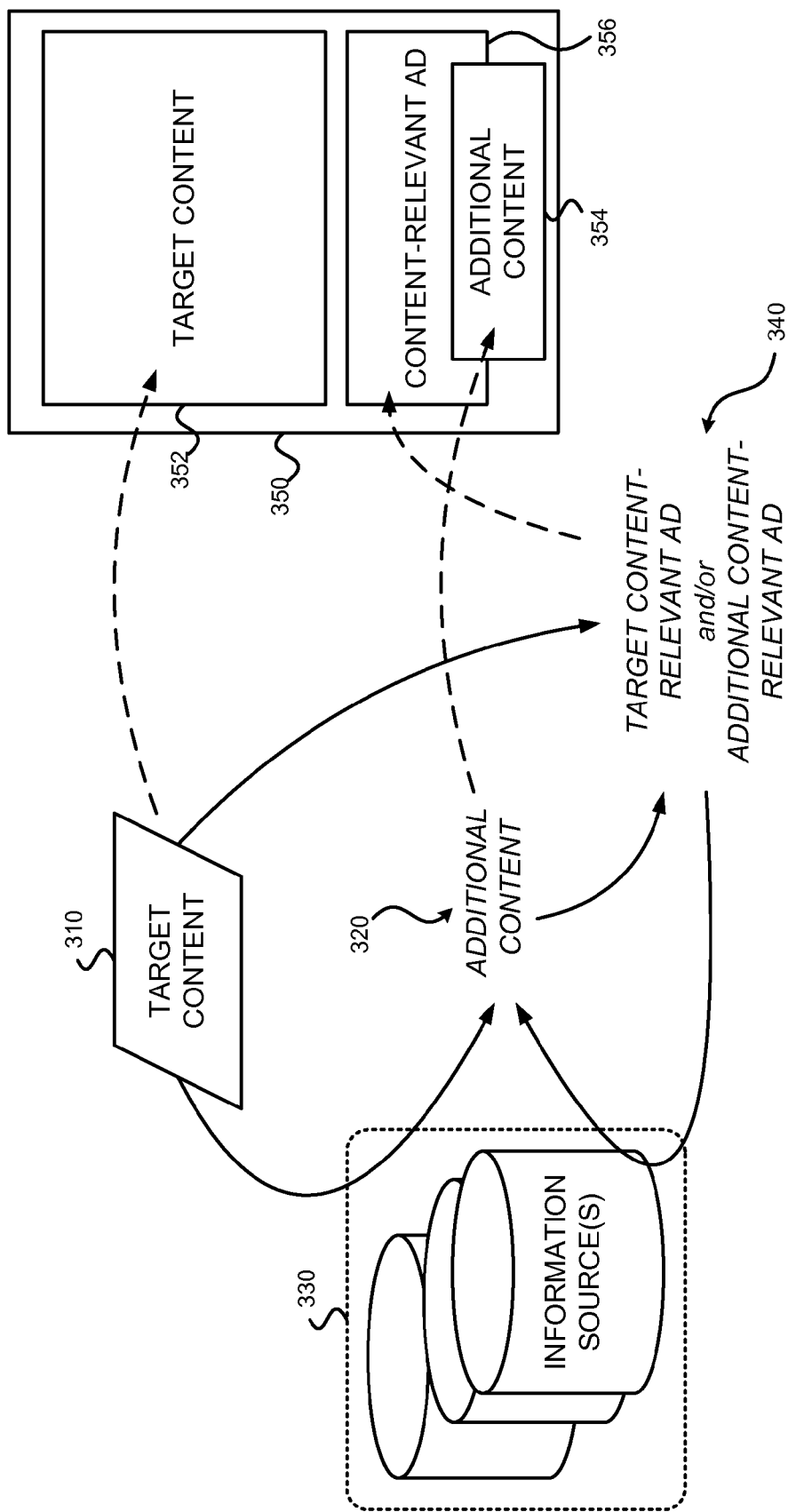
FIG. 3 illustrates exemplary operations of the present invention.

FIG. 3 illustrates an exemplary performance of the exemplary method 200 of the present invention. Additional content 320 is generated from target content 310 using information source(s) 330. One or more ads 340 relevant to the target content 310 and/or the additional content 320 may be generated. The target content 352, additional content 354 and content-relevant ad(s) 356 may be combined 350 for presentation to a user. For example, the combined information 350 may be spatially combined information on a Web page to be rendered to a user. As another example, the combined information 350 may be temporally combined information on an audio program to be rendered to a user. As yet another example, the combined information 350 may be spatially and/or temporally combined information on a video program to be rendered to a user.

Various exemplary applications of the present invention are now described with reference to FIGS. 4-7. Naturally, other applications of the present invention are possible, many of which will be apparent to those skilled in the art. The present invention is not limited to the following examples.

Example 1

Figure 4:
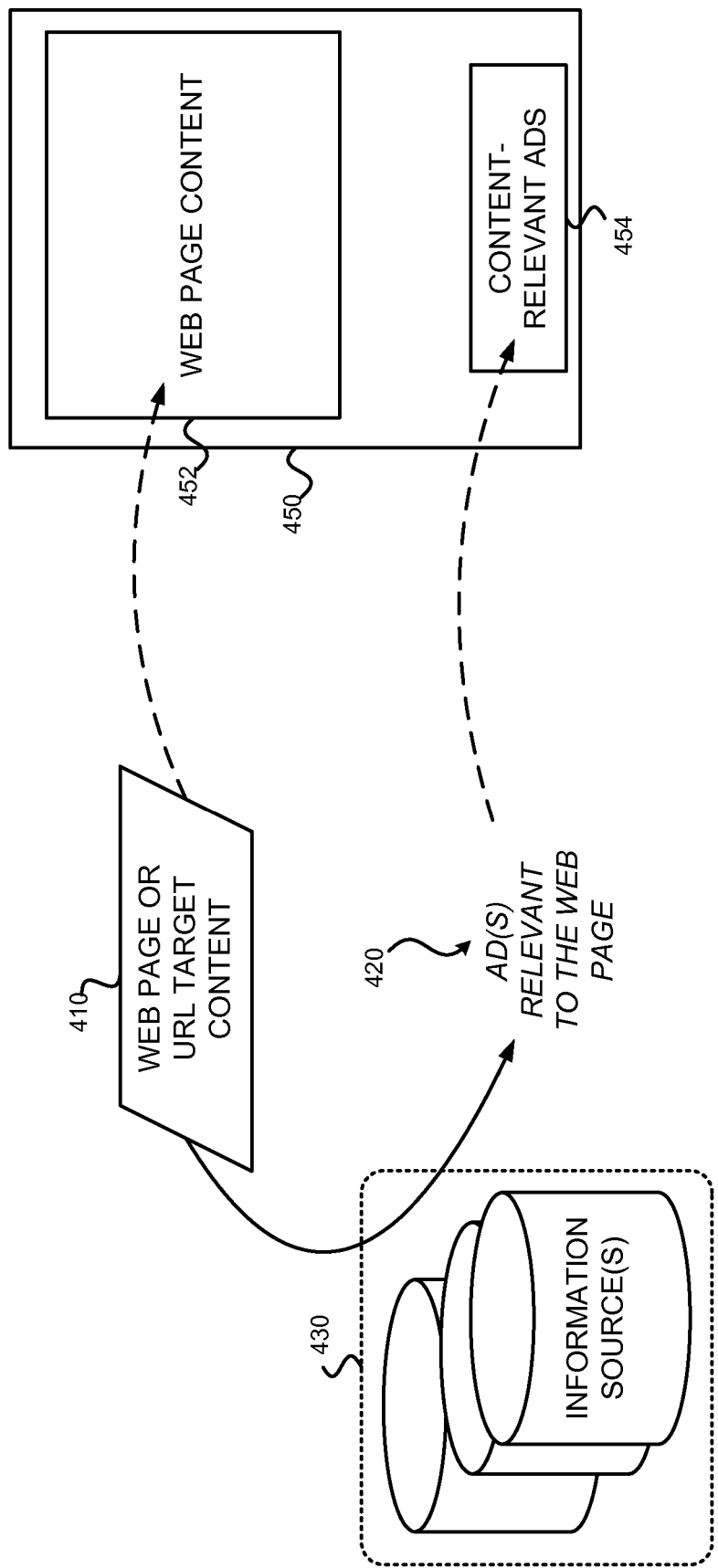
FIGS. 4-7 illustrates exemplary operations of the present invention in the context of various different exemplary applications.

FIG. 4 illustrates a first exemplary application of the present invention. Given a Web page or its URL (the target content) 410, advertisements (the additional content) 420 relevant to the web page/URL are generated using information sources 430. Exemplary techniques for performing such content-relevant ad serving are described in the '900 application. For example, a content-relevant ad server may use targeting information 430 associated with the ads. Combined information 450 to be presented to a user includes the target content 452 and one or more content-relevant ads 454.

Example 2

Figure 5:
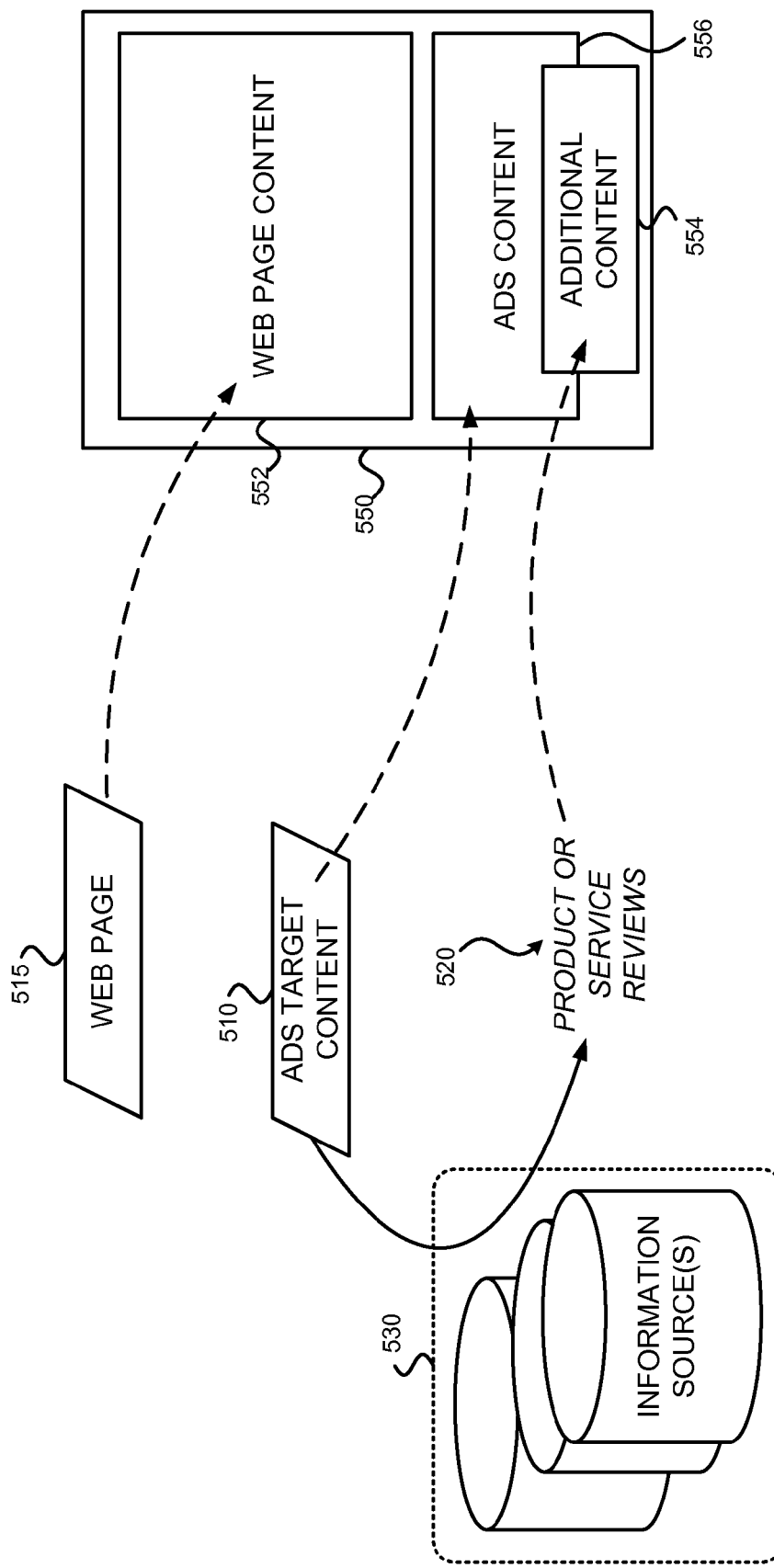

FIG. 5 illustrates a second exemplary application of the present invention. Given one or more advertisements (the target content) 510 for one or more product or service, one or more reviews about the product or service advertised, or a summary or excerpt of such review(s) (the additional content) 520 is generated from additional information 530 (e.g., editorial reviews, customer reviews, etc.). The combined information 550 to be presented to a user includes the ads 556 and the additional content 554. News stories, or a summary or excerpt of such stories, may be provided instead of, or in addition to, the reviews.

Note that the combined information 550 may include other content 552 such as that of a Web page 515 for example. Note that in one embodiment, the additional content may be selected and/or filtered to enhance the advertising message. For example, in one embodiment of the present invention, only additional content product review information including the phrase "top rated" or "best" are considered.

Example 3

Figure 6:
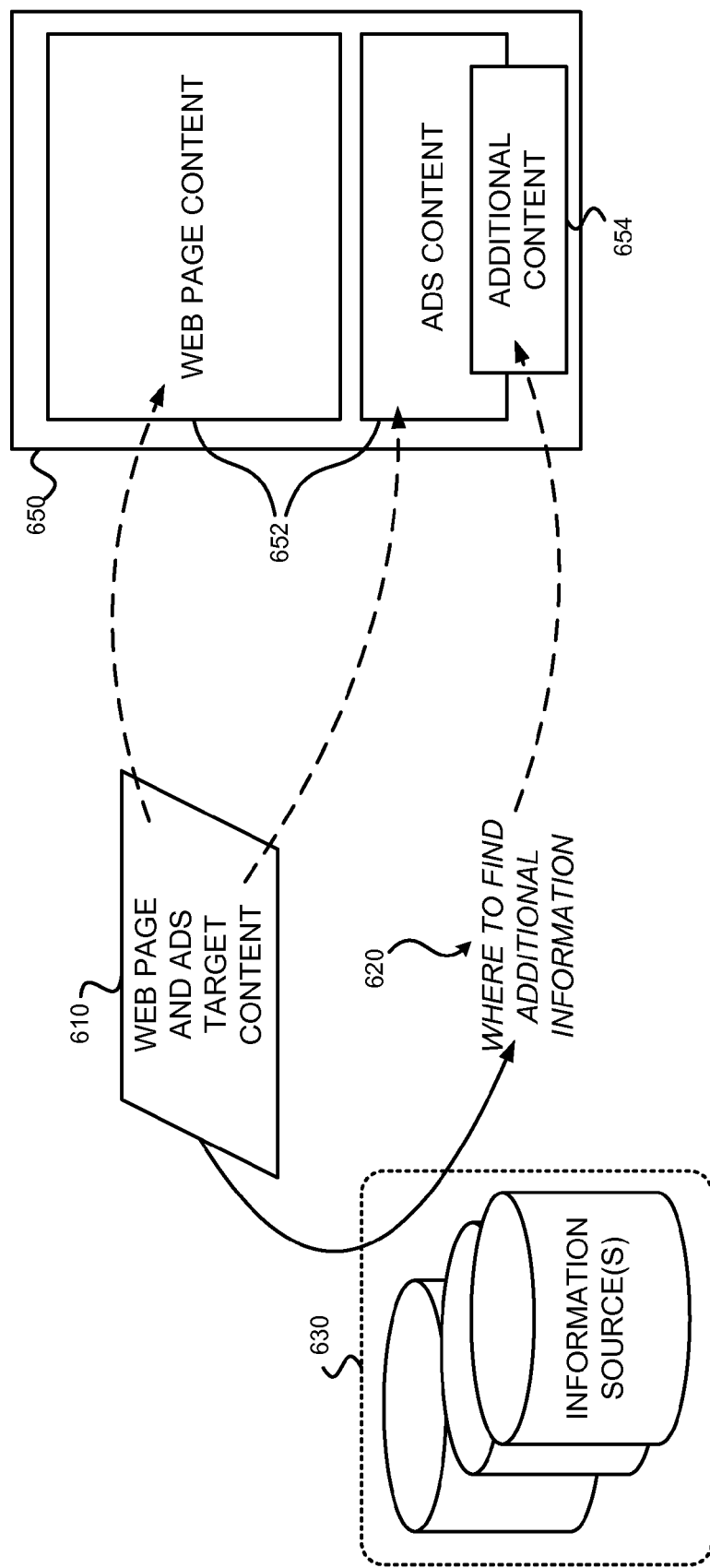

FIG. 6 illustrates a third exemplary application of the present invention. Given a Web page and one or more advertisements on the page (target content) 610, suggestions 620 on where and/or how to find additional information may be determined (e.g., "Interested in [how semiconductors work]? Visit {IBM's Materials Science page}, or {www.howstuffworks.com}, or query Google for {amorphous semiconductor/thin film devices/uhv cvd/ . . . }") may be determined from information sources 330. The combined information 650 to be presented to a user includes the Web page content and ads 652 and the additional content 654. In this example, the additional content 620 may be one or more search results from a search query generated from the target content. As this example illustrates, the target content 610 can have multiple components.

Example 4

Figure 7:
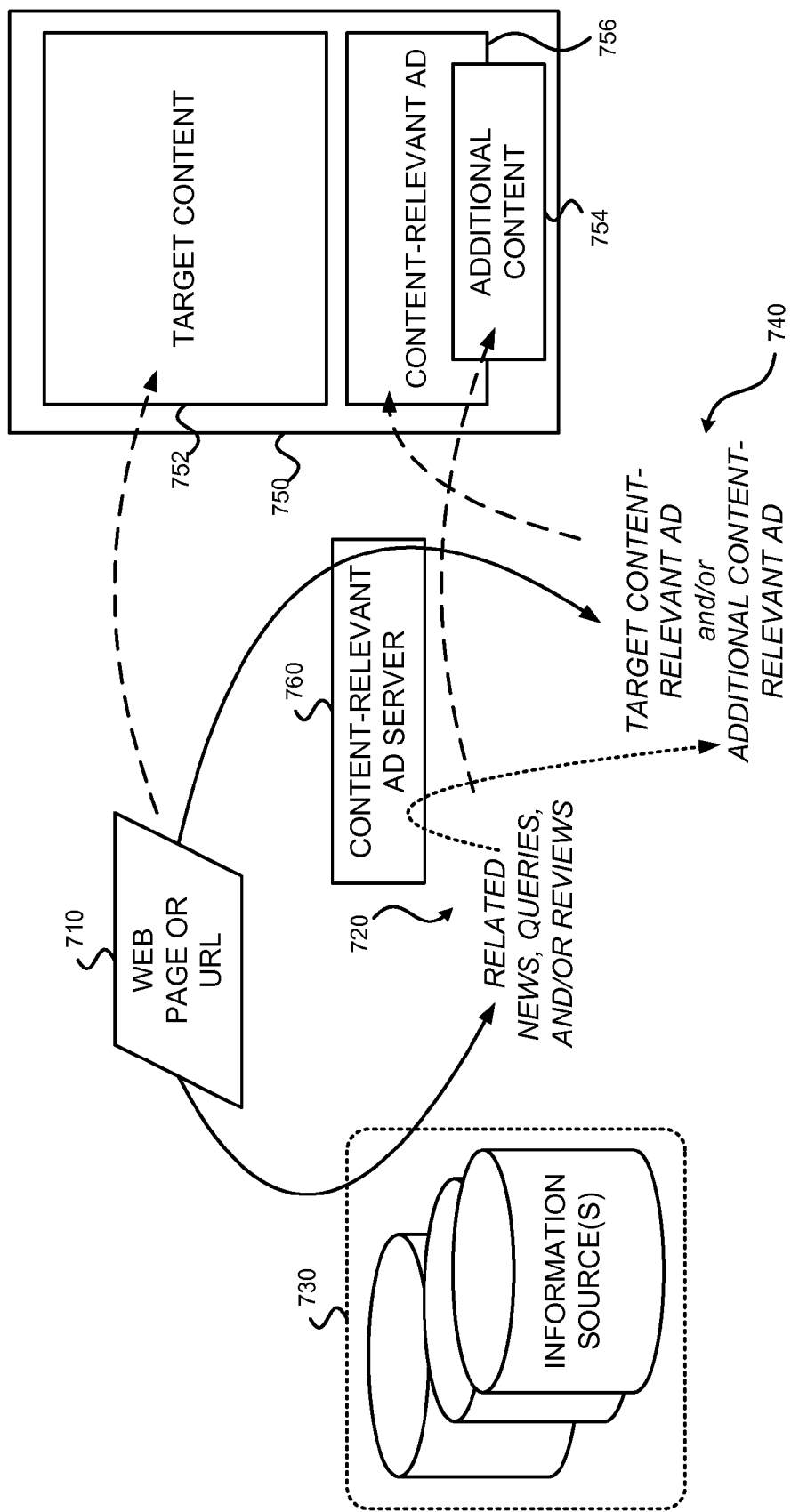

FIG. 7 illustrates a fourth exemplary application of the present invention. Text and/or a URL of a Web page is provided as the target content 710. Relevant information (e.g., related news, queries, reviews, etc.) 720 is generated using the target content 710 and other information sources 730. The other information sources 730 may include one or more of a list of queries, a set of current news articles, reviews of products and/or services, weather information, a set of advertisements, etc. The various items from the information sources 730 are each assigned a score based on how well it matches the contents of the Web page 710. The best scoring items 720 may be returned, in conjunction with the best scoring ads 740. The combined information 750 to be presented to a user includes the Web page content 752, the additional content 754, and the ads 756. The additional content may be provided in association with the ad(s) (e.g., placed within the ad, placed next to the ad, etc.) thus increasing the likelihood that the ads will be noticed. An example of the kind of information that might score high for a given Web page is provided below.

For the Web page http://www.research.ibm.com/disciplines/materials_science.shtml (IBM Research's Materials Science home page), the following queries may be identified as relevant using the contents of this page:
Query Google for:
amorphous semiconductor
thin film devices
uhv cvd
silicon technology
amorphous materials
semiconductor device simulation
This could be paired with advertisements such as:
Semiconductor Link Page
More than 1000 links to IC and
equipment manufacturers & News.
www.boin-gmbh.com/linkpage/linkpage
Low Yield Problem?
Finding why isn't always easy.
QYield can help. Click for details.
www.quadrillion.com
News stories can also be selected. For this page, the following news stories might be selected:
Chip oversupply expected to linger in '04—Electronic Buyers News
Chartered outlines new strategy, plans fab in China—EE Times Online
Referring to the short dashed arc in FIG. 7, in an alternative embodiment, the best scoring items can be used to help determine relevant ads. For example, given a Web page 710 about theme parks, a news item 720 from "current news" information sources 730 with a headline such as "Disney to Open Theme Park in Beijing Next Week" may be selected. The information selected 720 may be used to help target advertisements 740 to both the selected information and the content of the page:
'Buy Tickets to Beijing'
'Buy the book "Theme Parks in China"'

As the foregoing example illustrates, information from (a) the target content, (b) the additional content, or (c) both can be used to determine content-relevant ads.

§4.4 Exemplary Apparatus

Figure 8:
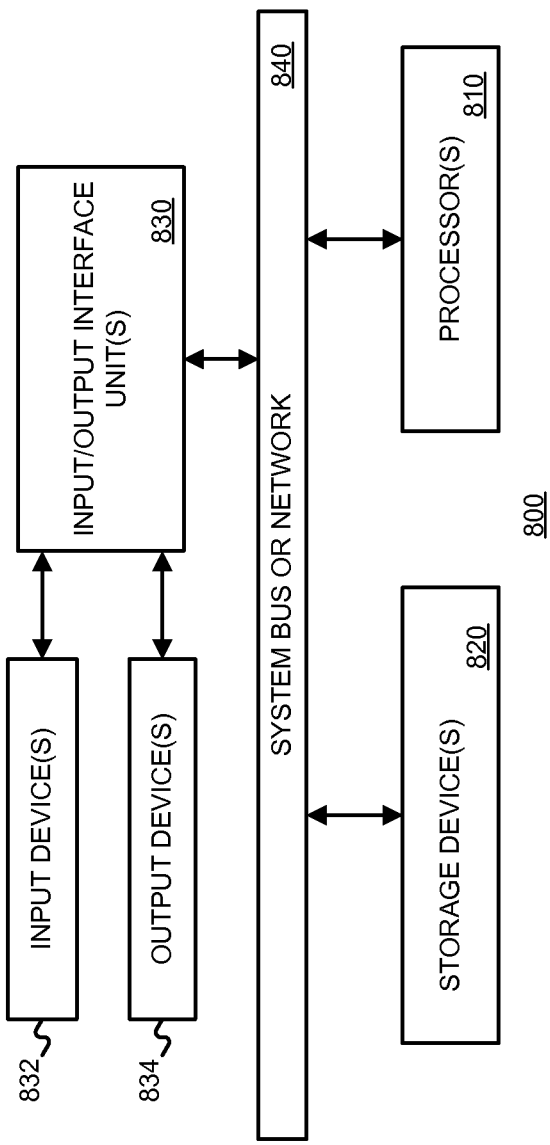
FIG. 8 is a block diagram of exemplary apparatus that may perform various aspects of the present invention.

FIG. 8 is high-level block diagram of a machine 800 that may perform one or more of the operations discussed above. The machine 800 basically includes one or more processors 810, one or more input/output interface units 830, one or more storage devices 820, and one or more system buses and/or networks 840 for facilitating the communication of information among the coupled elements. One or more input devices 832 and one or more output devices 834 may be coupled with the one or more input/output interfaces 830.

The one or more processors 810 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 820 and/or may be received from an external source via one or more input interface units 830.

In one embodiment, the machine 800 may be one or more conventional personal computers. In this case, the processing units 810 may be one or more microprocessors. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 832, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 810 through an appropriate interface 830 coupled to the system bus 840. The output devices 834 may include a monitor or other type of display device, which may also be connected to the system bus 840 via an appropriate interface. In addition to (or instead of) the monitor, the personal computer may include other (peripheral) output devices (not shown), such as speakers and printers for example.

Referring to FIG. 1, one or more of the ad server 110, the search engine 120, the content server 130, the e-mail server 140, the user device 150 and the content mixing server 160 can be machines, such as the machine 800.

§4.5 Conclusions

As can be appreciated from the foregoing, the present invention increases the usefulness of content, such as advertisements, by determining additional content and providing such additional content in association with the content.

What is claimed is:

1. A computer-implemented method comprising:
   receiving, with a computer system including at least one computer on a network, a request for an advertisement to be displayed on a Web page;
   receiving, with the computer system, information about the Web page, wherein the information is received from a source other than the Web page, and the information is not included in content of the Web page, the Web page including at least one advertising area for an advertisement;
   generating, with the computer system, an advertisement and additional content that is based on a source that differs from a source of the advertisement, the advertisement and the additional content being generated using the information about the Web page, the information received from the source other than the Web page, and information received from the source that differs from the source of the advertisement, wherein generating the additional content includes generating the additional content about a product or a service that is represented in the advertisement or a link to a webpage having content related to the product or the service; and
   serving, with the computer system, the generated advertisement in the advertising area or in proximity to the advertising area, to induce display of the generated advertisement and the generated additional content related to the information, received from the source other than the Web page, about the Web page, in association with the Web page, on a user device, wherein serving the generated advertisement in the advertising area or in proximity to the advertising area comprises encapsulating the generated additional content within the generated advertisement.

2. The computer-implemented method of claim 1 wherein the information received from the source other than the Web page are search results.

3. The computer-implemented method of claim 2 wherein the act of receiving the search results includes:
   generating a search query from the information received about the Web page;
   sending the search query generated to a search engine; and
   receiving the search results.

4. The computer-implemented method of claim 1 wherein the information received from the source other than the Web page includes a link to another Web page.

5. An apparatus comprising:
   at least one processor; and
   at least one storage device storing processor-executable instructions which, when executed by the at least one processor, cause the at least one processor to:
   receive a request for an advertisement to be displayed on a Web page;
   receive information about the Web page, wherein the information is received from a source other than the Web page, and the information is not included in content of the Web page, the Web page including at least one advertising area for an advertisement;
   generate an advertisement and additional content that is based on a source that differs from a source of the advertisement, the advertisement and the additional content being generated using the information about the Web page, the information received from the source other than the Web page, and information received from the source that differs from the source of the advertisement, wherein generating the additional content includes generating the additional content about a product or a service that is represented in the advertisement or a link to a webpage having content related to the product or the service; and
   serve the generated advertisement in the advertising area or in proximity to the advertising area, to induce display of the generated advertisement and the generated additional content related to the information, received from the source other than the Web page, about the Web page, in association with the Web page, on a user device, wherein serving the generated advertisement in the advertising area or in proximity to the advertising area comprises encapsulating the generated additional content within the generated advertisement.

6. The apparatus of claim 5 wherein the information received from the source other than the Web page are search results.

7. The apparatus of claim 6 wherein the act of receiving the search results includes:
   generating a search query from the information received about the Web page;
   sending the search query generated to a search engine; and
   receiving the search results.

8. The apparatus of claim 5 wherein the information received from the source other than the Web page include a link to another Web page.

9. A tangible, non-transitory, storage medium storing processor-executable instructions which, when executed by at least one processor, cause the at least one processor to:
   receive a request for an advertisement to be displayed on a Web page;
   receive information about the Web page, wherein the information is received from a source other than the Web page, and the information is not included in content of the Web page, the Web page including at least one advertising area for an advertisement;
   generate an advertisement and additional content that is based on a source that differs from a source of the advertisement, the advertisement and the additional content being generated using the information about the Web page, the information received from the source other than the Web page, and information received from the source that differs from the source of the advertisement, wherein generating the additional content includes generating the additional content about a product or a service that is represented in the advertisement or a link to a webpage having content related to the product or the service; and
   serve the generated advertisement in the advertising area or in proximity to the advertising area, to induce display of the generated advertisement and the generated additional content related to the information, received from the source other than the Web page, about the Web page, in association with the Web page, on a user device, wherein serving the generated advertisement in the advertising area or in proximity to the advertising area comprises encapsulating the generated additional content within the generated advertisement.

10. The tangible, non-transitory, storage medium of claim 9 wherein the information received from the source other than the Web page are search results.

11. The tangible, non-transitory, storage medium of claim 10 wherein the act of receiving the search results includes:
    generating a search query from the information received about the Web page;
    sending the search query generated to a search engine; and
    receiving the search results.

12. The tangible, non-transitory, storage medium of claim 9 wherein the information received from the source other than the Web page include a link to another Web page.

\* \* \* \* \*